US00RE34233E

United States Patent [19]

Bachot et al.

[11] E Patent Number: Re. 34,233

[45] Reissued Date of Patent: Apr. 27, 1993

[54] ELECTRICALLY CONDUCTIVE FIBROUS WEB SUBSTRATE AND CATHODIC ELEMENT COMPRISED THEREOF

[75] Inventors: Jean Bachot, Fonteray Aux Roses; Jean Grosbois, L'isle Adam, both of France

[73] Assignee: Atochem, Paris, France

[21] Appl. No.: 520,802

[22] Filed: May 9, 1990

Related U.S. Patent Documents

Reissue of:

[64] Patent No.: 4,743,349
Issued: May 10, 1988
Appl. No.: 906,435
Filed: Sep. 12, 1986

U.S. Applications:

[63] Continuation of Ser. No. 623,409, Jun. 22, 1984, abandoned.

[30] Foreign Application Priority Data

Jun. 22, 1983 [FR] France ..... 83 10291

[51] Int. Cl.[5] ..... C25B 9/00; C25B 11/06; C25B 11/12; D04H 1/58

[52] U.S. Cl. ..... 204/242; 204/252; 204/282; 204/290 R; 204/291; 204/294; 428/288; 428/290

[58] Field of Search ..... 428/288, 290; 204/290 R, 280, 282-284, 242, 294, 292, 293, 279

[56] References Cited

U.S. PATENT DOCUMENTS

| | | | |
|---|---|---|---|
| 4,061,557 | 12/1977 | Nishizawa et al. | 204/252 X |
| 4,130,473 | 12/1978 | Eddleman | 204/282 X |
| 4,265,727 | 5/1981 | Beckley | 204/242 |
| 4,301,218 | 11/1981 | Benczur-Ürmossy | 204/290 R X |
| 4,339,322 | 7/1982 | Balko et al. | 204/255 |
| 4,350,580 | 9/1982 | Kadija | 204/279 |
| 4,360,417 | 11/1982 | Reger et al. | 204/294 X |
| 4,429,216 | 1/1984 | Brigham | 428/288 X |
| 4,439,303 | 3/1984 | Cocci | 204/294 X |

FOREIGN PATENT DOCUMENTS

| | | |
|---|---|---|
| 0002787 | 7/1979 | European Pat. Off. . |
| 0026617 | 4/1981 | European Pat. Off. . |
| 0039022 | 11/1981 | European Pat. Off. . |
| 0066349 | 12/1982 | European Pat. Off. . |

*Primary Examiner*—Donald R. Valentine
*Attorney, Agent, or Firm*—Burns, Doane, Swecker & Mathis

[57] ABSTRACT

Bonded, coherent fibrous web substrates well adopted as cathodic elements for electrolytic cells and advantageously incorporating an electrocatalytic agent, include a web matrix which comprises a plurality of fibers, at least a portion of which comprising electrically conductive fibers, e.g., carbon fibers, said plurality of fibers being coherently bonded together with a fluorine-containing polymer, and said web substrate having a resistivity of up to about [0.4] *4.0* Ω.cm.

41 Claims, No Drawings

ELECTRICALLY CONDUCTIVE FIBROUS WEB SUBSTRATE AND CATHODIC ELEMENT COMPRISED THEREOF

Matter enclosed in heavy brackets [ ] appears in the original patent but forms no part of this reissue specification; matter printed in italics indicates the additions made by reissue.

This application is a continuation of application Ser. No. 623,409 filed Jun. 22, 1984.

BACKGROUND OF THE INVENTION

1. Field of the Invention

The present invention relates to a material which is especially adopted for the production of the cathodic element, or cathode, of an electrolysis cell, and particularly an electrolysis cell for aqueous alkali metal halide solutions. The invention also relates to a cathodic element per se, comprising said material. The invention lastly relates to processes for the production of said materials and of said cathodic elements, or cathodes, therefrom.

SUMMARY OF THE INVENTION

Briefly, the present invention features an improved web substrate material comprising a fibrous matrix and a binder therefor, at least a portion of the fibers comprising electrically conductive fibers, the binder therefor comprising a fluorine-containing polymer, and the resistivity thereof being less than about [0.4] *4.0* Ω.cm and preferably less than about [0.1] *1.0* Ω.cm.

For the purposes of this invention, by "web" there is intended a three-dimensional assembly, the thickness of which is substantially less than the smallest of the other dimensions, which assembly may or may not have two parallel face surfaces. These webs generally have substantially planar and rectilinear face surfaces but can also have a wide variety of shapes, and any such shape can in particular be determined by the shape of the material with which the web can be associated, as will hereinafter be more fully explained.

DETAILED DESCRIPTION OF THE INVENTION

More particularly according to this invention, purely by way of illustration, and assuming an end use of the webs according to the invention for the production of the cathodic element of a sodium chloride electrolysis cell, the thickness of such a web can range from 0.1 to 5 mm, and one of the large dimensions, which can essentially correspond to the height of the cathodic element, can be as great as 1 m, or even larger, while the other large dimension, which can substantially correspond to the perimeter of the said element, can be several tens of meters. It is reiterated that the aforesaid values are here given with the sole objective of indicating an order of magnitude of the webs according to the invention, but it is obvious that such indications in no way limit the field with which the present invention is concerned to webs of precise dimensions.

As stated above, one of the constituents of the webs according to the invention comprises fibers, at least a portion of which are electrically conductive fibers. The selection of the conductive fibers and their possible combination with non-conductive fibers follows from various criteria and especially from the value selected for the electrical resistance of the final product web, taking account of the presence of the polyfluoroolefin binder.

In the present case, electrically conductive fibers are any material, in the form of a filament whose diameter is generally less than 1 mm and preferably from $10^{-5}$ to 0.1 mm and whose length is greater than 0.5 mm and preferably from 1 to 20 mm, the said material having a resistivity equal to or less than 0.4 Ω.cm.

Such fibers can consist entirely of a material which is intrinsically a conductor of electricity; exemplary of such materials, representative are metal fibers and especially fibers of iron, ferrous alloys or nickel, or carbon fibers. It is also possible to use fibers produced from an electrically non-conductive material, the fibers then having been rendered conductive by means of an after-treatment: by way of example, representative are asbestos fibers rendered conductive by chemical or electrochemical deposition of a metal such as nickel, or zirconia ($ZrO_2$) fibers which have been rendered conductive by nickelling. In the case of fibers which have been rendered conductive by such treatment, this treatment is carried out under conditions such that the fiber resulting therefrom has the resistivity mentioned above.

It must be noted that this treatment of fibers, and in particular the nickelling mentioned above, not only makes it possible to increase the conductivity of fibers and of the web resulting therefrom but plays a certain electrocatalytic role; more general information concerning electrocatalytic agents will be given below.

It goes without saying that the two types of fibers, namely, the intrinsically conductive fibers and the fibers which have been rendered conductive, as explained above, can be present conjointly in the webs according to the invention. It is also to be understood that the invention encompasses the use of intrinsiclly conductive fibers, that is to say fibers having the maximum resistivity value mentioned above, which fibers have themselves been subjected to a treatment, such as, for example, nickelling, to increase their conductivity.

Provided that the maximum resistivity values mentioned above are respected, the conductive fibers can be used in combination with electrically non-conductive fibers, which expression denotes, in the present case, any filament whose resistivity is greater than 0.4 Ω.cm. In general, these fibers have a diameter of less than 1 mm and preferably of from $10^{-5}$ to 0.1 mm and a length greater than 0.5 mm and more generally from 1 to 20 mm.

Non-conductive fibers may be used to satisfy various requirements; in particular, their use may be justified by the mechanical properties desired for the product fibrous web. By way of illustration of non-conductive fibers within the ambit of the invention, representative are inorganic fibers such as asbestos fibers, glass fibers, quartz fibers and zirconia fibers, or organic fibers such as polypropylene or polyethylene fibers, which are optionally halogenated and especially fluorinated, polyhalogenovinylidene fibers and especially polyvinylidene fluoride fibers, or fibers of the fluorine-containing polymers which will be later discussed in connection with the binder of the webs according to the invention.

Though this is stated purely by way of illustration and without implying any limitation, it has been found that it is advantageous, where the intended application of the web of fibers is as a cathodic element of a sodium chloride electrolysis cell, effectively to use non-conductive fibers and in particular asbestos fibers in conjunction with the conductive fibers, which latter can advantageously comprise carbon fibers. In such a combination, the asbestos fibers and more generally the non-conductive fibers can represent up to 90% and preferably 20 to 70% by weight of the combination of conductive fibers and non-conductive fibers.

The binder for the fibrous webs according to the invention comprises a fluorine-containing polymer. The expression "fluorine-containing polymer" is intended to denote a homopolymer or a copolymer derived at least partly from olefinic monomers completely substituted with fluorine atoms, or completely substituted with a combination of fluorine atoms and one or more atoms selected from chlorine, bromine or iodine, per monomer.

Examples of fluorine-containing homopolymers or copolymers are polymers and copolymers derived from tetrafluoroethylene, hexafluoropropylene, chlorotrifluoroethylene and bromotrifluoroethylene.

Such fluorine-containing polymers can also contain up to 75 mole percent of units derived from other ethylenically unsaturated monomers containing at least as many fluorine atoms as carbon atoms, as, for example, vinylidene fluoride, vinylidene difluoride, and vinyl perfluoroalkyl ethers, such as the perfluoroalkoxyethylenes.

Of course, more than one fluorine-containing homopolymer or copolymer as defined above may be used in the invention. It goes without saying that it does not exceed the scope of the invention to use these fluorine-containing polymers in conjunction with a small amount, for example, up to 10 or 15% by weight, of polymers whose molecule does not contain fluorine atoms, such as, for example, polypropylene.

Consistent herewith, the fluorine-containing polymer is used as a binder for the fibers described above. The different modes of employing the said binder will be more fully explained later. At this point, it should simply be mentioned that in the webs according to the invention the fluorine-containing polymer can represent up to 60% of the total weight of the web, that is to say, fibers (conductive fibers optionally used in conjunction with non-conductive fibers)+binder, this proportion being most commonly between 5 and 50%.

The webs according to the invention have been defined above in terms of their essential constituents, namely, the fibers and the binder. Depending upon the various applications for which these webs are intended, they may at some stage of their existence contain other materials or additives. These materials or additives are enumerated below, and it has to be noted that the additives may be present simultaneously or conversely may succeed one another in the web, in the case of treatments carried out on the said web.

Purely by way of illustration, there may in the first instance be mentioned products which are not in the form of fibers and are capable either of improving the electrical conductivity of the web, or of improving its mechanical properties. Such materials can in particular comprise powders, which may be conductive powders such as graphite, nickel, iron or magnetite powders, or non-conductive powders, the term powder denoting a product whose particle size is less than 50 μm, and the conductivity thereof being assessed as in the case of the fibers. These powders and especially the non-conductive powders, which can for example comprise asbestos powders or hydrated oxide powders, may together with the binder contribute to achieving the cohesion of the web of fibers. Again purely by way of illustration, the amount of powder additive may be as much as 30% of the weight of the combination of conductive fibers plus fluorine-containing polymer.

The webs can also contain one or more electrocatalytic agents. The use of such catalysts, which catalysts may be in the form of a powder whose particle size may, for example, vary from 1 to 100 μm, makes it possible to combine the advantages associated with the use of an elementary cathode which possesses a direct coating of electrocatalytic agent (voltage gain on the order of 150 mV in the case of a sodium chloride electrolysis) and the advantages associated with the use of the webs of fibers in respect of current distribution, diaphragm support, etc.

By way of illustration of such electrocatalytic agents, exemplary are the metals of the platinum group, and especially platinum itself and palladium, and the nickel-zinc, nickel-aluminum, titanium-nickel, molybdenum-nickel, sulfur-nickel, nickel-phosphorus, cobalt-molybdenum and lanthanum-nickel alloys and pairs.

Also by way of illustration, the amount of electrocatalytic agent, regardless of the form in which it is present, may represent up to 50% of the weight of the bonded web and more generally from 1 to 30% of the weight thereof, depending upon the nature of the catalyst.

The webs can also contain hydrophilic agents. The use of such agents is especially recommended where the web is to be used in an aqueous medium, as, for example, in a process of electrolysis of aqueous sodium chloride solutions. The hydrophilic agent contributes to improving the wettability of the fiber web by counterbalancing, to some extent, the highly hydrophobic nature of the fluorinated polymers.

The hydrophilic agents may be selected from among various classes of products. They may in general be liquid or pulverulent products of organic or inorganic nature. As illustrative examples of such agents, representative are the surfactants such as sodium dioctylsulfosuccinate or inorganic compounds such as asbestos in the form of powder or of short fibers, zirconia, cerium dioxide, potassium titanate, hydrated oxides and especially alumina.

The amount of hydrophilic agent which can be present in the webs according to the invention of course depends upon the envisaged use of such web, the amount of hydrophobic product (essentially the fluorine-containing binder but also certain fibers contained in these webs) and the nature of the hydrophilic agent. As an order of magnitude, it may be mentioned that the amount of hydrophilic agent can be as much as 10% of the weight of the fluorine-containing binder and may more specifically be from 0.1 to 5% by weight of the said binder.

The webs may also contain pore-forming agents whose role is to regulate the porosity of the web, which porosity, in the case of application in electrolysis, influences the flow of the liquids and the discharge of the gases. It is to be noted that when such pore-forming agents are used, the final web, whose porosity will have been regulated or modified by the effect of decomposition or elimination of these agents, will in principle no longer contain these agents. By way of illustration of the pore-forming agents, representative are inorganic salts which can subsequently be removed by leaching out, and salts which can be removed by chemical or thermal decomposition, these being pereferred These various products can in particular be selected from among the alkali metal or alkaline earth metal salts, such as the halides, sulfates, sulfites, bisulfites, phosphates, carbonates and bicarbonates. There may also be mentioned amphoteric alumina or silica, which can be removed in an alkaline medium.

It also goes without saying that the amount and particle size of the pore-forming agents, where such agents are indeed used, is closely linked to the application for which the webs are intended. Simply as an order of magnitude, it may be mentioned that the particle size of the pore-forming agents most commonly varies from 5 to 50 μm and that the amount is selected in accordance with the desired porosity, which porosity can be as high as 90% or even more (measured according to Standard Specification ASTM D 276-72).

It is to be understood that each of the webs defined above in terms of its essential constituents and its additives in itself constitutes a novel product directly within the ambit of the present invention. This applies in particular to webs containing fibers, binder and electrocatalytic agent, with or without pore-forming agent, webs containing fibers, binder and hydrophilic agent, with or without electrocatalytic agent, and each of the above-mentioned webs additionally containing pore-forming agents and/or electrically conductive or non-conductive powders.

The present invention also relates to a process for the manufacture of the webs defined above. It is to be understood that the process which will be described below constitutes one method of producing the webs, namely, a wet production method, as will be clear from the description which follows, but that this description in no way limits the scope of the invention and that any process by which the claimed webs may be obtained, whether it be a different wet process or a dry process, is within the scope of the said invention.

This process essentially comprises the following stages:

(i) preparation of a suspension comprising the fibers and the binder; and (ii) removal of the liquid medium, and drying of the web.

As above outlined, the suspension contains, on the one hand, the electrically conductive fibers and, on the other hand, the binder comprising a fluorine-containing polymer, these constituents being dispersed in a liquid medium. Though this medium can be of very diverse nature, an aqueous medium or an electrolytic medium is typically used.

In this second case, the medium may, in addition to water, contain caustic soda, for example, in an amount of 5 to 20%, and sodium chloride, for example, in an amount of 5 to 20%. It goes without saying that this also applies to an electrolytic medium corresponding to the electrolysis of sodium chloride but that, mutatis mutandis, any other electrolytic medium may be used.

In general, it is advantageous to incorporate into the aqueous or electrolytic medium a small amount, for example, from 0.1 to 5% relative to the weight of the solids to be dispersed, of dispersants or surfactants, such as, for example, sodium dioctylsulfosuccinate and, more generally, anionic sulfonate surfactants, such as the $C_6$–$C_{24}$ alkyl sulfonates, sulfosuccinates and sulfocinamates.

It is to be understood that in the case where the final web is to contain other additives and especially those enumerated above in referring to non-conductive fibers, conductive or non-conductive powders, hydrophilic agents, pore-forming agents and catalytic agents, these can in general be incorporated at the stage of preparation of the initial suspension. However, apart from the case of the additional fibers which in principle must be dispersed among the conductive fibers, the other additives can also be introduced into the web by, for example, filtering through said web a suspension containing such agents.

The fluorine-containing polymer is in general in the form of a dry powder or of fibers or of an aqueous dispersion (latex) in general containing 30 to 70% of dry polymer. In general, the largest dimension of the particles or fibers of fluorine-containing polymer is less than 50 μm, the particle size usually ranging from 0.1 to 10 μm in the case of a polymer in powder form.

The suspension defined above in terms of its essential constituents and its optional additives is in general highly diluted, such that the ratio of suspension medium to solids (fibers, polymer and additives) is on the order of 30–100:1. These data correspond to an industrially usable suspension but of course a much higher ratio could be used.

In order to achieve an easily controllable filtration rate, it is possible to add to the suspension, where necessary, a thickener selected, for example, from among the natural or synthetic polysaccharides.

The various constituents may be introduced directly into the medium, especially into the aqueous medium which may or may not be an electrolytic medium.

According to one embodiment of the invention, especially when the fluorine-contained polymer is itself in the form of a dispersion, the fibrous materials (conductive fibers and, where relevant, non-conductive fibers), with addition of a dispersant, are dispersed, in a first stage, in a fraction, for example 1/5 to ½, of the final amount of dispersion medium, after which the fluorine-containing polymer is incorporated into this dispersion, the suspension subsequently being diluted and homogenized.

The next stage of the process according to the invention comprises forming the web containing the fibers, the fluorine-containing binder and, optionally, the other additives. This web can be formed by filtering the suspension through a highly porous medium, such as a metal net, for example, made of iron or bronze, whose mesh size may be from 20 μm to 5 mm. In general, this filtration is advantageously carried out under vacuum, generally following a program wherein the pressure is reduced, continuously or in stages, from atmospheric pressure to the final reduced pressure ($1.5\times10^3$ to $4\times10^4$ Pa).

The web resulting from this filtration can be dried, for example, at a temperature of from 70° to 120° C., for a period which can be from 1 to 24 hours. The final formation of the web, optionally after the drying stage mentioned above, comprises heating to a temperature above the melting point or softening point of the fluorine-containing polymer, for example to 5°–50° C. above this point, for a period which, depending upon the polymer and upon the temperature selected, can vary from 2 minutes to 60 minutes and more especially from 5 to 40 minutes.

The web thus formed and comprising a combination of conductive fibers bonded by a fluorine-containing polymer constitutes the primary object of the present invention, as above outlined.

The invention also and very particularly relates to the aforedescribed webs activated with an electrocatalytic agent. Various electrocatalytic agents which can be incorporated and dispersed in said web have been outlined above. According to one method of using electrocatalytic agents, and where the nature of the latter permits it, the agents may be deposited electrochemically onto the formed web. This technique is particularly valuable when it is desired to use nickel as the electrocatalytic agent, the nickel being deposited in the form of a nickel-zinc alloy which is then leached in an alkaline medium with the object of removing the zinc and obtaining nickel having a large surface area.

According to this technique, the web of fibers is deposited onto a cathode, the anode is nickel and the electrocatalytic bath contains both nickel and zinc halides. The nickel/zinc couple is deposited onto the electrically conductive fibers, with the zinc being removed therefrom as described immediately above.

According to other embodiments, also as already noted hereinbefore, it is possible to directly incorporate into the suspension an electrocatalytic agent in the form of a powder or to filter through the web of fibers, before or after fusion of the binder, a suspension of electrocatalytic agent in any desired liquid vehicle, most commonly water, to which surfactant may have been added with the object of maintaining the powders in dispersion, for example, in the case of the reduction of precious metal salts with sodium borohydride.

Another object of the invention is the composite material comprising the web which itself comprises the fibers and the fluorinated polymer defined above, and an elementary cathode. The term "elementary cathode", as utilized herein, denotes the metallic component, generally of iron or nickel, essentially consisting of a grid or a piece of perforated metal and serving as a cathode in an electrolysis cell. This elementary cathode can be a planar surface or a combination of planar surfaces or, in the case of electrolysis cells of the "glove finger" type, can be in the form of a cylinder whose directrix is a more or less complex surface, in general substantially rectangular, with rounded angles.

The web of fibers, bonded by means of the fluorine-containing polymer, may be assembled with the elementary cathode by various methods. According to a first procedure, the suspension is filtered directly through the elementary cathode and thereafter the combination of elementary cathode/web of fibers is heated to a temperature which allows the fluorine-containing polymer binder to fuse, as indicated above. According to another embodiment, the filtration of the suspension and formation of a web of fibers, and the fusion of the binder, are carried out separately, the last-mentioned operation being carried out alone after having applied the web to the elementary cathode. The choice between the different techniques may depend upon the nature of the elementary cathode (grid, perforated metal or expanded metal) and upon the desired degree of penetration of the web of fibers into the meshes or perforations of the elementary cathode.

The composite material comprising the elementary cathode and the web of fibers, as described above, in fact itself constitutes the cathode of an electrolysis cell, this application to the production of the cathodic element of an electrolysis cell being the preferred but not the exclusive field of application of the materials according to the invention. In the case of such an application it is possible, according to currently common practice, to use a membrane or diaphragm between the anode and cathode compartments in the cell. In the case of a membrane, the latter can be selected from among the numerous electrolysis membranes described in the literature; the composite element according to the invention constitutes an excellent mechanical support and ensures remarkably effective current distribution. This current distribution is of course dependent upon the particular structure of the composite elements according to the invention. Moreover, the large number of current conductors (conductive fibers) ensures maximum voltage gain because of the large active surface, which gain can be increased if the electrocatalytic elements have been dispersed in the web of fibers in one or another of the forms disclosed above.

The composite material can also be associated with a diaphragm. This diaphragm, which can also be selected from among the numerous currently known electrolysis diaphragms, can be manufactured separately. It can also, and this constitutes an advantageous embodiment, be produced directly on the web of fibers or on the composite structure of web of fibers/elementary cathode. This direct manufacture is particularly easy if the diaphragm is manufactured by filtering a suspension. These techniques of manufacture of membranes or of porous and microporous diaphragms are described, for example, in French Pat. Nos. 2,229,739, 2,280,435 and 2,280,609 and published French Patent Application No. 81/9688, hereby expressly incorporated by reference.

The composite materials, consisting of an assembly successively comprising, from one face surface to the other, the elementary cathode, the web of fibers bonded by the fluorine-containing polymer and the porous or microporous membrane or diaphragm, constitute yet a further subject of the invention. Such composite materials constitute coherent combinations which enjoy all of the advantages inherent in the web of fibers and in the composite of web of fibers/elementary cathode, to which is added the considerable advantage of elimination of the conventional interface between the diaphragm and the cathode, and the elimination of its adverse effects, namely, a stray ohmic drop in the gas-liquid emulsion in the vicinity of the cathode substrate.

In order to further illustrate the present invention and the advantages thereof, the following specific examples are given, it being understood that same are intended only as illustrative and in nowise limitative.

EXAMPLES 1 to 3

These examples illustrate the production of webs of fibers bonded by a fluorine-containing polymer.

(a) Preparation of the carbon fibers

The carbon fibers were prepared as follows:

Dry method: carbon flock and the same amount of NaCl (50 to 62.5 g of each ingredient) were treated, over 4 minutes, in a grinder-mixer. The fibers, whose mean length was 1 to 3 mm and mean diameter was 5 to 10 μm were withdrawn. Their resistivity was less than $5.10^{-3}$ Ω.cm.

Wet method: the same carbon flock was ground in 1 liter of water. The properties of the fibers were identical.

(b) Preparation of the suspension

Two methods were used:

Type I: aqueous method.

A suspension was prepared from 100 g of fibers consisting of 37 or 50 g of the carbon fibers described under (a) and 63 or 50 g of asbestos fibers, which in the case of type A were of the chrysotile variety, with a mean length of between 1 and 5 mm and a mean diameter of about 200 A, or in the case of type B were of the chrysotile variety, with a length of from 5 to 20 mm and a mean diameter of about 200 A, 1 g of sodium dioctylsulfosuccinate in the form of a 65% strength aqueous solution and 7,000 g of softened water.

After this suspension had been stirred for 30 minutes, there were introduced into it 40 to 80 g of polytetrafluoroethylene (PTFE) in the form of an aqueous latex of 60% solids content or in the form of a powder of particle size less than 50 μm. The mixture was again stirred for 30 minutes.

Type II: alkaline method.

The procedure followed was as for the aqueous method but the softened water was replaced by the same amount of electrolytic sodium hydroxide solution (150 g/l of NaCl and 150 g/l of NaOH). Either polytetrafluoroethylene as a powder or in the form of a latex, or 30 g of polychlorotrifluoroethylene (PCTFE) in the form of a powder of mean particle size 50 μm were used.

This suspension was stirred by means of air for 30 minutes (the air being circulated at a flow rate of 10 $m^3/h$).

(c) Manufacture of the web of fibers:

The suspension I or II was filtered through a bronze net of mesh size 40 μm, employing the following program of application of vacuum: 1 minute of settling out, followed by successive stages, lasting 1 minute, of increasing vacuum in steps of 100 Pa.

The web obtained after filtration was detached from the net and heated in an oven at 350° C. for 10 minutes if the polymer was PTFE or at 260° C. for 30 minutes if the polymer was PCTFE.

The details of the operating procedure and of the final webs are as follows:

| | EXAMPLES | | |
|---|---|---|---|
| | 1 | 2 | 3 |
| Type of suspension | I | I | II |
| Ratio of carbon fibers/asbestos | 63/37 | 63/37 | 50/50 |
| Fluorine-containing polymer | | | |
| PTFE powder | x | | |
| PTFE latex | | x | |
| PCTFE | | | x |
| Asbestos | A | B | B |
| Weight of Fluorine-containing polymer (kg/m[1] of web) | 0.03 | 0.03 | 0.05 |
| Thickness of the final web (in mm) | 1.0 | 2.1 | 1.1 |
| Resistivity (Ω.cm) | [0.06] *0.6* | [0.07] *0.7* | [0.09] *0.9* |

EXAMPLES 4 to 9

The suspensions described under section (b) of Examples 1 to 3 were used, but these suspensions were filtered through an elementary cathode consisting of:

(i) a net of woven and rolled iron (wire diameter 2 mm, mesh size 2 mm), (ii) a plate of perforated iron (thickness 1.5 mm, diameter of holes 3 mm, distance between axes 5 mm, quincunx arrangement), or (iii) a plate of perforated nickel (thickness 1.5 mm, diameter of holes 3 mm, distance between axes 5 mm, quincunx arrangement).

The composite material resulting from this filtration and from fusing the fluorine-containing polymer (12 hours at 100° followed by 10 minutes at 350°) was used, as obtained, as the cathode in a sodium chloride electrolysis cell (operating under 25 $A/dm^2$ at 85° C. - sodium hydroxide output 120 to 140 g/l).

To carry out the measurements, the diaphragm was placed at 10 mm from the surface of the composite material and the potential of this composite material (cathodic element) was measured using a Luggin probe applied to its surface (9 measurements distributed over ½ $dm^2$, with the mean potential calculated). The active surface area of the electrolyzer was ½ $dm^2$.

In this novel cathode, the extra thickness of the web of fibers bonded by means of this fluorine-containing polymer, present on the surface of the elementary cathode, varied from 0.1 to 1 mm depending upon the amount of suspension filtered.

The operating procedures and the measurements are summarized in the table which follows:

In this table ΔUmv/ECS denotes the potential measured on the surface of the composite material (on the fiber web side) or of the cathodic surface relative to a saturated calomel electrode (the potential being expressed in mV).

| No. | Elementary cathode | Suspension | Carbon fibers/ Asbestos fibers (weight) | Type of asbestos | Extra thickness of web (mm) | Binder | Umv/ECs |
|---|---|---|---|---|---|---|---|
| | | | CONTROLS | | | | |
| 1 | Woven and rolled iron | | Elementary cathode only | | | | −1370 |
| 2 | Perforated iron | | | | | | −1380 |
| 3 | Perforated nickel | | | | | | −1430 |
| | | | EXAMPLES | | | | |
| 4 | Woven and rolled iron | I | 63/37 | A | 1 | PFTE latex | −1430 |
| 5 | Woven and rolled iron | II | 63/37 | A | 1 | PFTE latex | −1470 |
| | | | EXAMPLES | | | | |
| 6 | Woven and rolled iron | II | 50/50 | A | 1 | PCTFE | −1450 |
| 7 | Woven and rolled iron | I | 63/37 | B | 0.1 | PTFE latex | −1370 |
| 8 | Woven and rolled iron | II | 50/50 | B | 0.1 | PTFE powder | −1380 |

-continued

| No. | Elementary cathode | Suspension | Carbon fibers/ Asbestos fibers (weight) | Type of asbestos | Extra thickness of web (mm) | Binder | Umv/ECs |
|---|---|---|---|---|---|---|---|
| 9 | Perforated nickel | I | 63/37 | B | 0.1 | PTFE latex | −1460 |

It will be seen from this table that the composite materials, consisting solely of fibers and the binder, provide, at a very small thickness, a potential substantially equal to the potential measured on the elementary cathode.

The increase in the thickness of the web of fibers also increases the potential, but this increase remains very acceptable.

EXAMPLES 10 to 28

In this series of experiments, the cathodic elements were activated by an electrochemical coating (Examples 10 and 11), by nickeling of fibers (Examples 12 and 13) and by addition of an electrocatalytic element in the form of a powder (Examples 14 to 28), the general technique of manufacture of the composite (elementary cathode + web of fibers) being that of Examples 4 to 9.

(a) The electrochemical coating was carried out as follows: the cathodic element of Example 4 was used as the cathode of an electrolyzer, the anode of which consisted of nickel. The electrolytic bath contained:

(i) $NiCl_2.6H_2O$ = 1 mole/liter
(ii) $NH_4Cl$ = 1 mole/liter
(iii) $ZnCl_2$ = 15 g/liter The electrolysis was carried out in a stirred medium, at 20° C., with a current density of 10 A/dm$^2$. The operation lasted 30 minutes. After this operation, during which a nickel-zinc alloy was deposited onto the conductive fibers of the cathodic element, the latter was immersed for 2 hours into the electrolytic sodium hydroxide solution (concentration 15 g/l) at 80° C. Upon completion of this operation, the zinc had been removed and the amount of nickel deposited represented about 30% of the weight of the web of fibers.

The results were as follows:

| Example | Ratio of carbon fibers/asbestos fibers | Potential of the cathodic element (ΔUmv/ECS) | Comparison: Elementary cathode | Comparison: Non-activated cathodic element |
|---|---|---|---|---|
| 10 | 63/37 | −1.250 | −1.370 | −1.430 |
| 11 | 50/50 | −1.230 | −1.370 | — |

(b) In the second activation technique, Example 4 was repeated using either nickeled carbon fibers (63) and asbestos fibers (37), or exclusively nickeled asbestos fibers.

The following results were observed:

| Examples | Ratio of carbon fibers/ asbestos fibers | Nickeling of the fibers | Potential of the cathodic element (ΔUmv/ECS) |
|---|---|---|---|
| 12 | 63/37 | carbon | −1.325 |
| 13 | 0/100 | asbestos | −1.340 |

(c) The third activation technique comprised the addition of the electrocatalytic element in powder form.

The procedure was as follows: 1st method (Examples 14 to 16):

A suspension of type I, containing 60 g of PTFE powder, the ratio of carbon fibers/asbestos fibers being either 63/37 or 100/0, was deposited onto an elementary cathode consisting of perforated soft iron (thickness 1.5 mm, diameter of holes 3 mm; distance between axes 5 mm; quincunx arrangement).

A suspension of platinum or a suspension of palladium was filtered through the cathodic element obtained (following the general technique of Examples 4 to 9), under the following conditions:

Platinum suspension (for 1 liter of suspension):

2.4 g of $H_2PtCl_6$ were dissolved in 800 cm$^3$ of water containing 1% of α-[4-(1,1,3,3-tetramethyl-butyl)-phenyl]-ω-hydroxy-poly-(oxyethanediyl), and 0.9 g of sodium borohydride were dissolved in 200 cm$^3$ of water, and these two solutions were mixed under slow stirring.

Suspension of palladium (for 1 liter of suspension):

5.5 g of $PdCl_2$ were dissolved in 5 cm$^3$ of 3N HCl and diluted to 800 cm$^3$ with water containing 1% of α-[4-(1,1,3,3-tetramethyl-butyl)-phenyl]-ω-hydroxy-poly(oxyethanediyl), 0.9 g of sodium borohydride were dissolved in 200 cm$^3$ of water, and these two solutions were mixed, under stirring.

After filtration, the cathodic elements were drained, dried (at 100° for 12 hours) and heated at 350° for 10 minutes.

The following results were found:

| Examples | Ratio of carbon fibers/ asbestos fibers | Activation: Nature | Activation: g/dm$^2$ | Potential of the cathodic element (ΔUmv/ECS) |
|---|---|---|---|---|
| 14 | 63/37 | Platinum | 0.2 | −1.250 (−1.380) |
| 15 | 100/0 | Platinum | 0.2 | −1.280 |
| 16 | 63/37 | Palladium | 0.2 | −1.260 |

In this table, the amount of activator was expressed as weight of platinum or palladium metal deposited per dm$^2$ of surface area of the cathodic element.

The value of the potential shown in parentheses was that of the elementary cathode alone. 2nd method (Examples 17 to 28):

Activators in powder form, of particle size equal to or less than 50 μm, were incorporated directly into the suspension.

In the table which follows, the terms or abbreviations have the following meanings:

Type denotes the type of suspension (aqueous or alkaline, as in Examples 1 to 3).

C/A denotes the weight ratio of carbon fibers/asbestos fibers.

P/C+A denotes the weight ratio of fluorine-containing polymer/carbon fibers+asbestos fibers.

Po/A denotes the weight ratio of pore-forming agent/asbestos fibers.

| | Characteristics of the cathodic element | | | | | | Activator | | Potential (Umv/ECS) of the cathodic |
|---|---|---|---|---|---|---|---|---|---|
| Example | Type | Polymer | Pore-forming agent | C/A | P/A + C | Po/A | Nature | g/dm² | element |
| 17 | 1 | PTFE latex | — | 63/37 | 12/100 | 0 | Pt | 0.2 | −1250 |
| 18 | 1 | " | — | 63/37 | 12/100 | 0 | Ti—Ni | 2 | −1380 |
| 19 | 1 | " | — | 63/37 | 12/100 | 0 | $Ti_2$—Ni | 2 | −1290 |
| 20 | 1 | " | — | 63/37 | 12/100 | 0 | $LaNi_5$ | 2 | −1320 |
| 21 | 1 | " | — | 63/37 | 12/100 | 0 | Mo—$Co_3$ | 2 | −1260 |
| 22 | 1 | " | — | 63/37 | 12/100 | 0 | Ni—Al | 2 | −1280 |
| 23 | 1 | " | — | 50/50 | 15/100 | 0 | Ni—Al | 2 | −1270 |
| 24 | 1 | " | — | 50/50 | 15/100 | 0 | Ni—Al | 1 | −1290 |
| 25 | 1 | " | $CaCO_3$ | 50/50 | 20/100 | 100/50 | Pt | 0.2 | −1260 |
| 26 | 1 | " | $Al_2O_3$ | 50/50 | 20/100 | 50/50 | Pt | 0.2 | −1240 |
| 27 | 11 | PTFE powder | — | 63/37 | 60/100 | 0 | Ti—Ni | 2 | −1290 |
| 28 | 11 | PTFE powder | — | 63/27 | 30/100 | 0 | Ti—Ni | 2 | −1280 |

EXAMPLES 29 to 40

In the experiments which follow, the cathodic element had been combined with a diaphragm.

(a) Assembly technique:

The cathodic element used was manufactured from an elementary cathode of woven and rolled iron and a suspension of type I, containing a PTFE latex and asbestos fibers (A) and having a ratio of carbon fibers/asbestos fibers of 63/37. This element was activated if desired.

The diaphragm was deposited onto this element by drawing through it, under a programmed vacuum, a suspension comprising:

| | |
|---|---|
| (i) $H_2O$ | 3.300 g |
| (ii) Na sulfosuccinate | 1 g |
| (iii) Asbestos fibers A | 100 g |

into which there had been incorporated, after stirring for half an hour,

| | |
|---|---|
| (iv) PTFE latex | 133 g (latex solids content = 60%) |
| (v) Pore-forming agent ($Al_2O_3$ containing 25% of Al) | 40 g. |

the entire mass then having been stirred for half an hour, left to stand for 24 hours, and dispersed and homogenized again for 15 minutes before use.

The deposition under a programmed vacuum was carried out as follows:

(1) 1 minute of settling out (2) 1 minute under a reduced pressure of $9\times10^2$ Pa (3) 1 minute under a reduced pressure of $7.5\times10^2$ Pa (4) 1 minute under a reduced pressure of $6\times10^2$ Pa (5) 1 minute under a reduced pressure of $5\times10^2$ Pa After the diaphragm had been deposited, the combination of cathodic element and diaphragm was drained and maintained at 100° for 12 hours and then at 350° for 10 minutes.

The pore-forming agent was removed by alkaline treatment before setting up in the electrolyzer.

(b) Use in electrolysis:

The electrolysis conditions were those indicated in the preceding examples except that the inter-electrode distance was reduced to 6 mm.

The following values were measured:

| | |
|---|---|
| FY | Faraday yield |
| ΔU (volts) | voltage at the electrolyzer terminals |
| NaOH, g/l | concentration on exiting the electrolyzer. |

In addition, the value of $\Delta U_{I\to O}$ was measured by plotting $\Delta U=f(I)$ or an intensity/potential curve.

The following results were obtained for a constant anodic chloride concentration of 4.8 mole/liter:

| | Cathodic element | | | Results | | | |
|---|---|---|---|---|---|---|---|
| Example | Weight (kg/m³)* | Activation | Diaphragm kg/m² | ΔUI → O volts | ΔU volts | NaOH g/l | FY % |
| 29 | 0.3 | — | 1.5 | 2.34 | 3.45 | 180 | 92 |
| 30 | " | — | " | 2.33 | 3.53 | " | 94 |
| 31 | " | — | " | 2.34 | 3.48 | " | 93 |
| 32 | 0.3 | Nickeled carbon fibers | 1.5 | 2.31 | 3.44 | 180 | 94 |
| 33 | " | | " | 2.30 | 3.36 | " | 90 |
| 34 | " | | " | 2.31 | 3.42 | " | 92 |
| 35 | 0.3 | Platinum 0.2 g/cm² | 1.5 | 2.27 | 3.36 | 180 | 93 |
| 36 | " | | " | 2.22 | 3.32 | " | 95 |
| 37 | " | | " | 2.25 | 3.32 | " | 92 |
| 38 | 0.3 | Ni—Al 2 g/cm² | 1.5 | 2.30 | 3.40 | 180 | 94 |
| 39 | " | | " | 2.25 | 3.38 | " | 93 |
| 40 | " | | " | 2.26 | 3.30 | " | 91 |

*except for the elementary cathode

It will be seen from the above results:

At 180 g/l the Faraday yields are of the same order for all of the experiments, namely, about 93%.

The voltage extrapolated to $I_O$ is lowered by activation by nickeling of the fibers and especially in the presence of a catalyst.

| Type of activation | Control | Nickeled fibers | Platinum | Ni—Al |
|---|---|---|---|---|
| Mean $\Delta U_{I \to O}$ | 2.34 | 2.31 | 2.25 | 2.27 |

The voltage at the terminals evidences the same increased voltage gains.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A bonded, coherent fibrous web substrate including a fibrous web matrix which comprises a plurality of fibers, at least a portion of which comprising electrically conductive fibers, and a binder consisting of a fluorine-containing polymer, said plurality of fibers being coherently bonded together with said fluorine-containing polymer, and said web substrate having a resistivity of up to about [0.4 Ω cm.] *4.0 Ω.cm.*

2. The web substrate as defined by claim 1, having a resistivity of up to [0.1] *1.0* Ω.cm.

3. The web substrate as defined by claim 1, said conductive fibers comprising filamentary elements having diameters of less than about 1 mm and lengths in excess of about 0.5 mm.

4. The web substrate as defined by claim 3, said conductive fibers comprising filamentary elements having diameters ranging from about $10^{-5}$ to 0.1 mm and lengths ranging from about 1 to 20 mm.

5. The web substrate as defined by claim 1, said web matrix comprising electrically non-conductive fibers having a resistivity in excess of 0.4 ω.cm, the diameters of which being less than about 1 mm and the lengths of which being in excess of about 0.5 mm.

6. The web substrate as defined by claim 5, said non-conductive fibers having diameters ranging from about $10^{-5}$ to 0.1 mm and lengths ranging from about 1 to 20 mm.

7. The web substrate as defined by claim 5, said conductive fibers comprising carbon fibers.

8. The web substrate as defined by claim 5, said non-conductive fibers comprising asbestos fibers.

9. The web substrate as defined by claim 5, the weight of said non-conductive fibers comprising up to 90% by weight of the total weight of said conductive fibers plus said non-conductive fibers.

10. The web substrate as defined by claim 9, the weight of said non-conductive fibers comprising from 20 to 70% by weight of the total weight of said conductive fibers plus non-conductive fibers.

11. The web substrate as defined by claim 1, said conductive fibers comprising carbon fibers.

12. The web substrate as defined by claim 1, said binder comprising a fluorinated homo- or copolyolefin.

13. The web substrate as defined by claim 12, at least some of the fluorinated monomer units comprising said polyolefin being completely fluorosubstituted.

14. The web substrate as defined by claim 12, at least some of the fluorinated monomer units comprising said polyolefin being completely halosubstituted with fluorine atoms and at least one chlorine, bromine or iodine atoms, or combinations thereof.

15. The web substrate as defined by claim 12, said fluoropolymer comprising tetrafluoroethylene, hexafluoropropylene, chlorotrifluoroethylene or bromotrifluoroethylene monomer units, or combination thereof.

16. The web substrate as defined by claim 12, said fluoropolymer comprising up to 75% of ethylenically unsaturated monomer units having at least as many fluorine atoms as carbon atoms.

17. The web substrate as defined by claim 1, said fluorine-containing polymer binder comprising up to 60% by weight of the total weight of said web.

18. The web substrate as defined by claim 17, said fluorine-containing polymer binder comprising from 5 to 50% by weight of the total weight of said web.

19. The web substrate as defined by claim 1, comprising at least one electrocatalytic agent.

20. The web substrate as defined by claim 19, said at least one electrocatalytic agent comprising particulates having particle sizes ranging from 1 to 100 μm.

21. The web substrate as defined by claim 20, said electrocatalytic particulates comprising a platinum group metal, or a nickel-zinc, nickel-aluminum, titanium-nickel, molybdenum-nickel, sulfur-nickel, nickel-phosphorus, cobalt-molybdenum, or lanthanum-nickel alloy, or pair thereof.

22. The web substrate as defined by claim 19, said at least one electrocatalytic agent comprising up to 50% by weight of the total weight of the bonded web.

23. The web substrate as defined by claim 22, said at least one electrocatalytic agent comprising from 1 to 30% by weight of the total weight of the bonded web.

24. The web substrate as defined by claim 19, further comprising hydrophilic agents, conductive powders or nonconductive powders.

25. A web substrate as defined by claim 1 produced by a process comprising formulating a liquid suspension which comprises said fibers and said fluorine-containing polymer binder, forming a fibrous web by elimination of the liquid medium therefrom, and drying the fibrous web thus formed.

26. The web substrate defined by claim 25, said liquid suspension comprising at least one additive selected from among non-conductive fibers, conductive powder, non-conductive powder, hydrophilic agent, pore-forming agent, and catalytic agent.

27. The web substrate defined by claim 25, said liquid suspension being formulated by incorporating a dispersion of the fluorine-containing polymer binder into a dispersion of said fibers, the fibers being dispersed in from 1/5 to ½ of the final amount of the liquid dispersion medium.

28. The web substrate defined by claim 25, said fibrous web being formed by filtering said suspension through a highly porous material under programmed vacuum.

29. The web substrate of claim 28, wherein additives such as conductive powders, nonconductive powders, nonconductive fibers, hydrophilic agents, pore-forming agents and catalytic agents are in suspension and are introduced into said formed web by filtering the suspension through the web.

30. The web substrate defined by claim 25, comprising drying said fibrous web for from 1 to 24 hours at a temperature of from 70° to 120° C. and thence coherently bonding same by heating said dried web at a temperature from 5° to 50° C. higher than the melting or softening point of said fluorine-containing polymer for from 2 to 60 minutes.

31. A cathodic element comprising the web substrate as defined by claim 1.

32. The cathodic element at defined by claim 31, comprising an electrocatalytic agent.

33. The cathodic element as defined by claim 31, comprising an electrolysis diaphragm separator.

34. In an electrolytic cell comprising a cathode and an anode, the improvement which comprises utilizing as the cathode therefor, the cathodic element as defined by claim 31.

35. A cathodic element comprising a composite of an elementary cathode which includes a metallic surface and the web substrate as defined by claim 1.

36. The web substrate of claim 1, further comprising a pore forming agent of an alkali metal salt, an alkaline metal salt or amphoteric alumina or silica, which pore forming agents are removable by leaching or chemical or thermal decomposition.

37. The web substrate of claim 36, wherein the particle size of the pore-forming agent is rom 5–50 μm and used so as to provide a porosity of at least 90% or more.

38. The web substrate of claim 36, wherein the particle size of the pore-forming agent is from 5–50 μm and used so as to provide a porosity of 90% or less.

39. The web substrate as defined by claim 1, further comprising hydrophilic agents, conductive powders or nonconductive powders.

40. The web substrate as defined by claim 39, wherein the hydrophilic agent is sodium dioctylsulfosuccinate.

41. A bonded, coherent fibrous web substrate including a fibrous web matrix which comprises a plurality of fibers, at least a portion of which comprise electrically conductive fibers, and a binder consisting of a fluorine-containing polymer, said plurality of fibers being coherently bonded together with said fluorine-containing polymer, and said web substrate having a resistivity of up to about [0.4 Ω cm] *4.0 Ω.cm*, wherein said web matrix comprises electrically non-conductive fibers having a resistivity in excess of 0.4 Ω cm, the diameters of which being less than about 1 mm and the lengths of which being in excess of about 0.5 mm and electrically conductive fibers.

* * * * *